Patented Apr. 7, 1953

2,634,289

UNITED STATES PATENT OFFICE 2,634,289

β-HALOETHOXYETHYL-N-PHENYL-CARBAMATE

John Mann Butler, Centerville, Ohio, assignor to Monsanto Chemical Company, St. Louis, Mo., a corporation of Delaware No Drawing. Application December 29, 1948, Serial No. 68,080

2 Claims. (Cl. 260—471)

This invention relates to a new class of chemical compounds having particular utility in the control of mites. More specifically, this invention relates to the haloethoxyethyl esters of N-phenyl carbamic acid.

Many of the commercially available insecticides and the recently developed insecticides have little effect on spider mites. Some of the insecticides, for example, dichlorodiphenyltrichloroethane, actually are beneficial to some species of spider mites due to the destruction of their natural enemies. Accordingly, specific biocides are desired for specific control of the various spider mites.

The primary purpose of this invention is to provide new and effective compounds for the destruction or control of the spider mites. A further purpose of this invention is to prepare a new family of chemical compounds having valuable application in the biocide field.

The compounds of this new class of biocides may be represented by the following structural formula:

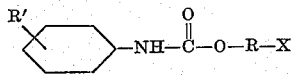

wherein X is a halogen atom, R is a divalent oxahydrocarbon radical, and R' is a radical of the class consisting of chlorine, hydrogen, alkyl and phenyl radicals. Suitable oxahydrocarbon radicals are the alkylene radicals containing ether oxygen substituted for a CH$_2$ group, for example, 3-oxapentamethylene and homologues thereof. Although any halogen substituent on the divalent oxahydrocarbon radical may be used, the chlorine and fluorine are the most effective; the fluorine derivative being especially effective.

The new class of chemical compounds are prepared by condensing phenylisocyanate with the halogen substituted oxaalcohols and separating the resulting product. The reaction is preferably conducted under anhydrous conditions, and in the presence of an organic solvent such as carbon tetrachloride. The desired products are separated from the reaction mass by distillation at reduced pressures.

The new chemical compounds have unusual activity in destroying spider mites, especially the two spotted mite.

Further details of the invention are set forth with respect to the following example.

Example

Equimolar mixtures of 18.6 parts by weight of phenyl isocyanate and 17 parts of β-fluoroethoxyethanol were warmed to induce the condensation. The reaction produced a solid precipitate which was dissolved by the addition of dry carbon tetrachloride. The mixture was heated to boiling and then permitted to cool to room temperature. A solid substance identified as diphenylurea was removed by filtration. The carbon tetrachloride was removed from the product by heating on a steam bath at reduced pressures. A light colored oil, so produced, was identified as β-fluoroethoxyethyl-N-phenyl carbamate.

The product prepared in the preceding example was tested to determine its efficacy in killing the two spotted mite, and the β-fluoroethyl ester of N-phenyl carbamic acid was used as a control. It was found that one part in a million of the compound destroyed one hundred percent of the two spotted mite, whereas the control was effective in destroying only a negligible number of the mites. It was also found that the tested compound destroyed 95 percent of the eggs, whereas the control compound was totally ineffective. Phyto toxicity tests, made on bean plants, did not show any deleterious effects.

The invention is defined by the following claims.

I claim:

1. β-Fluoroethoxyethyl-N-phenyl carbamate.
2. A compound having the structural formula:

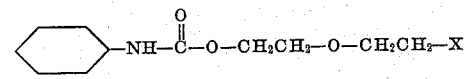

wherein X is a halogen atom.

JOHN MANN BUTLER.

REFERENCES CITED

The following references are of record in the file of this patent:

UNITED STATES PATENTS

| Number | Name | Date |
|---|---|---|
| 2,291,528 | Bruson et al. | July 28, 1942 |
| 2,297,728 | Taylor et al. | Oct. 6, 1942 |

FOREIGN PATENTS

| Number | Country | Date |
|---|---|---|
| 574,995 | Great Britain | Jan. 30, 1946 |